US011821439B2

(12) United States Patent
Tsai (10) Patent No.: US 11,821,439 B2
(45) Date of Patent: Nov. 21, 2023

(54) LIQUID COOLING HEAT EXCHANGE APPARATUS

(71) Applicant: Cooler Master Co., Ltd., New Taipei (TW)

(72) Inventor: Shui-fa Tsai, New Taipei (TW)

(73) Assignee: Cooler Master Co., Ltd., Taipei (TW)

( * ) Notice: Subject to any disclaimer, the term of this patent is extended or adjusted under 35 U.S.C. 154(b) by 47 days.

(21) Appl. No.: 17/464,699

(22) Filed: Sep. 2, 2021

(65) Prior Publication Data

US 2022/0065267 A1     Mar. 3, 2022

(30) Foreign Application Priority Data

Sep. 2, 2020  (TW) ................................ 109130025

(51) Int. Cl.
  *F04D 29/58*   (2006.01)
  *F04D 29/40*   (2006.01)
  *F04D 29/00*   (2006.01)

(52) U.S. Cl.
  CPC ....... *F04D 29/5806* (2013.01); *F04D 29/005* (2013.01); *F04D 29/406* (2013.01); *F04D 29/5866* (2013.01)

(58) Field of Classification Search
  CPC . F04D 29/406; F04D 29/5806; F04D 29/5866
  See application file for complete search history.

(56) References Cited

U.S. PATENT DOCUMENTS 10,866,031 B2 *  12/2020  Pan ..................... F28F 13/06

FOREIGN PATENT DOCUMENTS

CN       108733183      * 11/2018
DE     202019102043     *  5/2019

OTHER PUBLICATIONS

English translation of DE202019102043 (Year: 2019).*
English translation of CN108733183 (Year: 2018).*

* cited by examiner

*Primary Examiner* — Woody A Lee, Jr.
*Assistant Examiner* — Brian O Peters (57) ABSTRACT

A liquid cooling heat exchange apparatus comprising a water block set and pump unit is provided. The water block set has a water block cover having an inlet port, cover diversion channel, cover diversion opening, cover outlet through hole and outlet port, surge directing plate having a plate cover end, and water block. The pump unit has a rotor housing having an impeller cavity comprising an inlet and outlet. The inlet and outlet ports and the cover diversion opening is at a same side, the cover outlet through hole is at an opposite side. During operation, working fluid is sucked via the inlet port, pass the cover diversion channel covered by the plate cover end, through the cover diversion opening and impeller cavity inlet, through the impeller cavity, and outlet, and cover outlet through hole, and through the water block, before exiting through the outlet port.

11 Claims, 7 Drawing Sheets

LIQUID COOLING HEAT EXCHANGE APPARATUS

RELATED APPLICATIONS

The application claims the benefit of priority to Taiwan application no. 109130025, filed on Sep. 2, 2020, of which is incorporated herein by reference in its entirety.

TECHNICAL FIELD

Example embodiments relate generally to the field of heat transfer and, more particularly, to liquid cooling heat exchange apparatuses.

BACKGROUND

During operation of electric and electronic elements, devices and systems, the heat generated thereby, for example, by CPUs, processing units, or graphic boards, must be dissipated quickly and efficiently to keep operating temperature within manufacturer recommended ranges, under, at times, challenging operating conditions. As these elements, devices and systems increase in functionality and applicability, so does the power requirements thereof, and this, in turn increases cooling requirements. Meeting cooling requirements is further exacerbated by trends toward lighter, thinner, and smaller electric and electronic elements, devices and systems.

Several techniques have been developed for extracting heat from electric and electronic elements, devices and systems. One such technique is a liquid-cooling system, whereby a water block is in thermal contact with the elements, devices and/or systems, transporting heat away therefrom, and then working fluid, circulating inside of a cooling loop system incorporating the water block, flows over the water block by a stator assembly, removing heat therefrom. Heat is transferred from the heat source to the water block, the water block to the working fluid, and the working fluid to the environment by a radiator.

Generally, a maximum operating temperature of electric and electronic elements, devices and systems is defined and an appropriate liquid-cooling system dependent on a water block, radiator, and pump unit is provided. Pump efficiency, is determined by head and flow rate, in addition to working fluid properties, impeller design and motor speed. When lighter, thinner, and smaller electric and electronic elements, devices and systems are required with a same head specification for a pump of a heavier, wider, and larger counterpart electric and electronic elements, devices and systems, lighter, thinner, and smaller pumps of liquid-cooling system meeting the head specification are lacking. This is further complicated for liquid-cooling systems having an aesthetically pleasing appearance providing a more relaxed environment for fatigued users of computers who spend long times at tasks.

SUMMARY

In an embodiment, a liquid cooling heat exchange apparatus configured to be flow through by a working fluid, comprising a water block set and a pump unit is provided. The water block set comprises a water block, water block cover and a surge directing plate. The water block, having a heat transfer surface comprising a width, is configured to exchange heat with the working fluid. The water block cover is securely mounted on the water block facing the heat transfer surface and comprises an inlet port, a cover diversion opening, a cover outlet through hole and an outlet port. The surge directing plate is assembled to and communicating with and between the water block cover and water block. The pump unit, securely mounted on the water block set, comprises a rotor housing, a stator assembly, and a pump cover. The rotor housing is securely mounted on and communicating with the water block cover opposite the water block. The rotor housing comprises an impeller cavity having an impeller cavity inlet and an impeller cavity outlet. The stator assembly is assembled to the rotor housing opposite the impeller cavity, facing the water block cover, and is configured to increase a pressure and flow through of the working fluid. The pump cover is securely mounted on the rotor housing opposite the stator assembly. The working fluid flows through the inlet port and cover diversion opening before flowing through the impeller cavity inlet and impeller cavity outlet, and then through the cover outlet through hole and throughout the heat transfer surface, and then through the outlet port. The inlet port and outlet port are on a same side of the water block cover. The cover diversion opening is near to the same side of the inlet and outlet ports and the cover outlet through hole is near to an opposite side of the inlet and outlet ports.

In some embodiments, the water block further comprises a plurality of heat transfer surface features on the heat transfer surface, and the surge directing plate comprises a surge directing opening, disposed centrally and longitudinally therethrough, and an outlet cut out, on a corner end thereof. The surge directing plate is assembled on and completely covering the heat transfer surface and the surge directing opening is aligned to the heat transfer surface. The working fluid flows through the cover outlet through hole at an end of the surge directing opening opposite the outlet cut out before flowing through the surge directing opening and throughout the heat transfer surface and then through the outlet port via the outlet cut out.

In certain embodiments, the water block is in direct or indirect contact with a heat source opposite the heat transfer surface.

In certain embodiments, the water block cover further comprises a cover diversion channel communicating with and between the inlet port and cover diversion opening, facing the heat transfer surface, and the working fluid flows through the inlet port and cover diversion opening via the cover diversion channel.

In certain embodiments, the surge directing plate further comprises a plate cover end on a same side as the outlet cut out, configured to assemble to and cover the cover diversion channel. The working fluid flows through the inlet port and cover diversion opening via the cover diversion channel covered by the plate cover end.

In some embodiments, the pump unit further comprises an impeller having a plurality of curved blades on a blade assembly surface thereof, mounted to a shaft, and an impeller cover having at least one through hole, covering the impeller. In some embodiments, the rotor housing further comprises a stator cavity opposite the impeller cavity. The stator assembly is mounted in the stator cavity and the impeller and impeller cover is mounted in the impeller cavity. The working fluid flows through the impeller cavity inlet and impeller cavity outlet via an outer side of the impeller cover, through the at least one through hole, and then through an inner side of the impeller cover, whereby the impeller is rotatable in the impeller cavity and the stator assembly drives the impeller.

In some embodiments, the inlet and outlet ports are integrally formed with the water block cover and configured for mounting of at least one of a fitting, a connector, or a conduit.

In some embodiments, the pump cover comprises at least one of a transparent or translucent material. In certain embodiments, the impeller cover comprises at least one of a transparent or translucent material.

In some embodiments, the liquid cooling heat exchange apparatus further comprises an aesthetic cover positioned on the water block cover, the rotor housing, and the pump cover. The aesthetic cover at least partially enclosing water block cover, the rotor housing, and the pump, wherein the aesthetic cover defines a cover opening on a top surface of the aesthetic cover.

In certain embodiments, the liquid cooling heat exchange apparatus further comprises a light apparatus having one or more light sources, assembled to an inner surface of the aesthetic cover, wherein light from the light assembly is emitted from the liquid cooling heat exchange apparatus through the cover opening.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of water block systems incorporating aspects of the presently disclosed principles are illustrated by way of example, and not by way of limitation.

DETAILED DESCRIPTION

The following describes various principles related to liquid cooling systems by way of reference to specific examples of water block sets and pump units, including specific arrangements and examples of water block covers and rotor housings embodying innovative concepts. More particularly, but not exclusively, such innovative principles are described in relation to selected examples of surge directing plates and channels and well-known functions or constructions are not described in detail for purposes of succinctness and clarity. Nonetheless, one or more of the disclosed principles can be incorporated in various other embodiments of surge directing plates and channels to achieve any of a variety of desired outcomes, characteristics, and/or performance criteria.

Thus, liquid cooling heat exchange apparatuses having attributes that are different from those specific examples discussed herein can embody one or more of the innovative principles, and can be used in applications not described herein in detail. Accordingly, embodiments of liquid cooling heat exchange apparatuses not described herein in detail also fall within the scope of this disclosure, as will be appreciated by those of ordinary skill in the relevant art following a review of this disclosure.

Example embodiments as disclosed herein are directed to liquid cooling systems, configured within a chassis or as part of an electric or electronics system that includes heat generating elements or devices to be cooled. A water block is in thermal contact with electric and/or electronic elements, devices and/or systems, transporting heat away therefrom, and then working fluid, such as a cooling liquid, circulating inside of a cooling loop system incorporating the water block via fluid conduits, flows over the water block by a pump unit, removing heat therefrom. The heated working fluid is output from the liquid cooling system and may be input to a radiator. Next, the heated working fluid may flow to and through the radiator, whereby, the radiator may have a plurality of heat fins thereon for increased heat dissipation. The radiator may also comprise one or more fans, coupled to a back end thereof, transporting air through the radiator to an air plenum or to an outside of the chassis or electric or electronics system. Then the working fluid may flow from the radiator to the liquid cooling system to once again begin the cooling loop. Although the cooling loop includes a liquid cooling system, more than one liquid cooling system may be coupled to the radiator. In this manner, multiple liquid cooling systems and/or a larger heat generating area may be cooled. Each of the liquid cooling systems may be adjacently configured in rows or differently, allowing for design flexibility enabling application-specific configurations.

Figure 1:
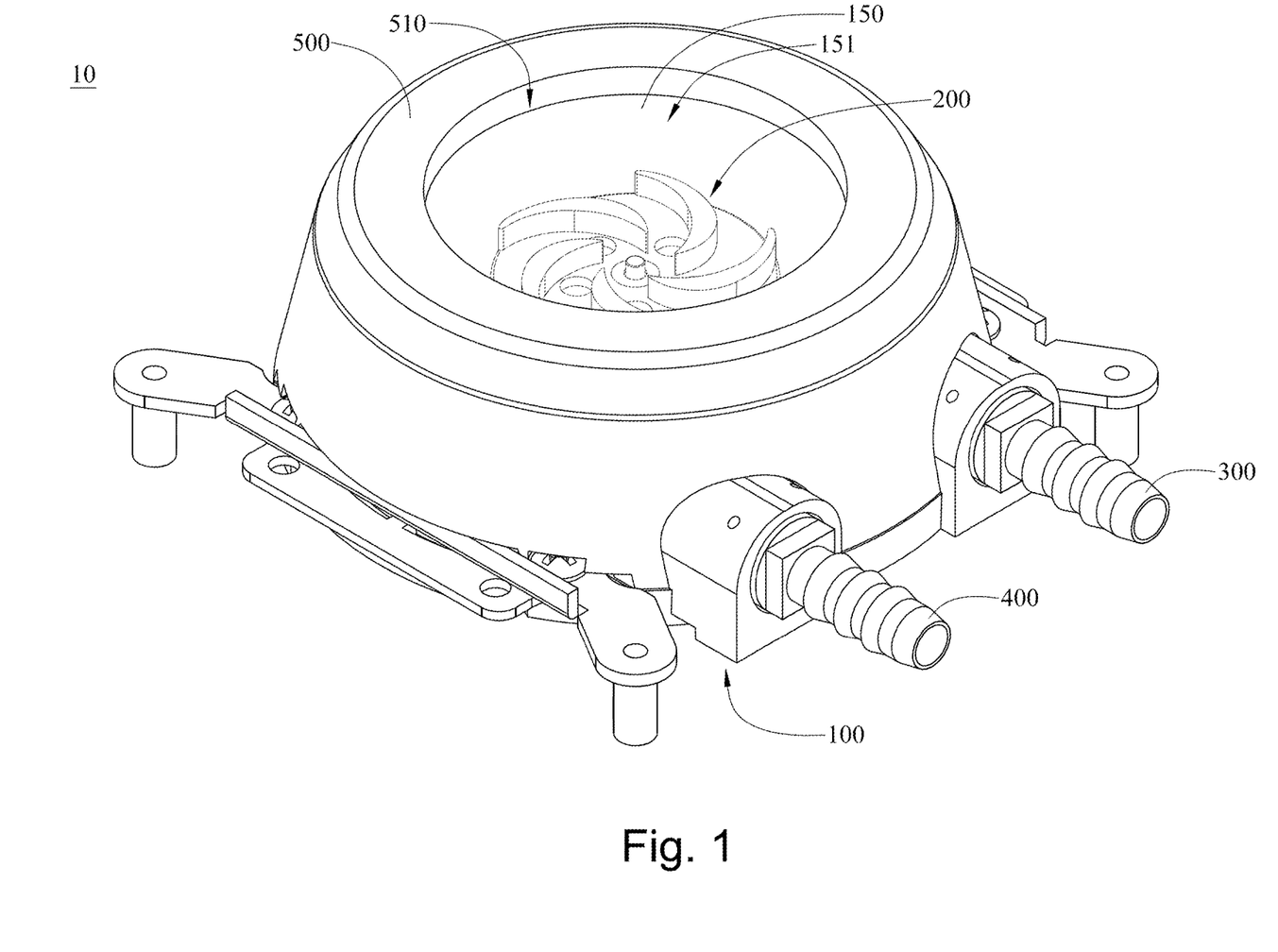
FIG. 1 depicts a representation of an embodiment of a liquid cooling heat exchange apparatus.
Figure 2:
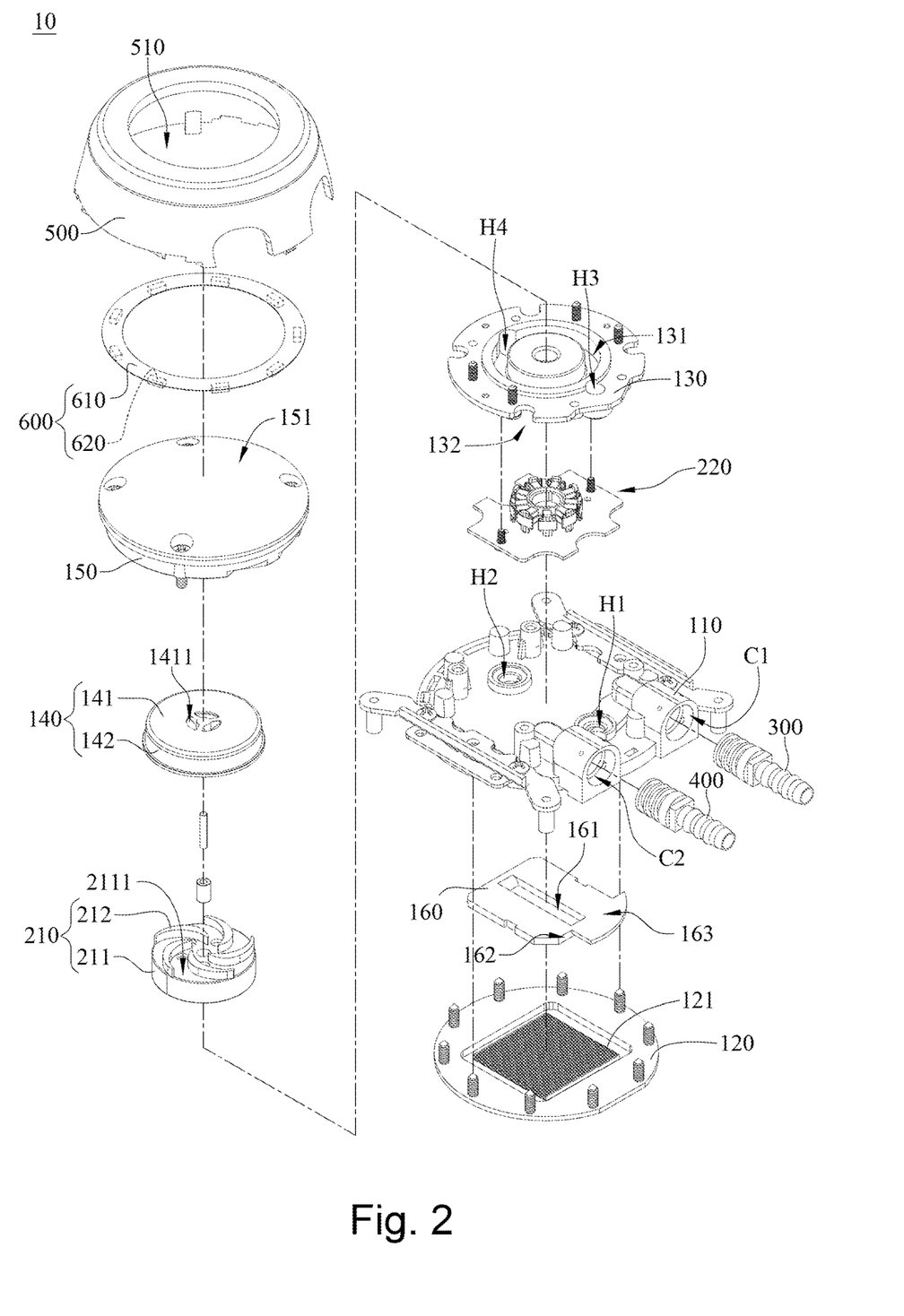
FIG. 2 depicts an exploded view of the embodiment of the liquid cooling heat exchange apparatus of FIG. 1.

In an embodiment, a liquid cooling heat exchange apparatus 10 configured to be flow through by a working fluid comprising a water block set 100 and a pump unit 200 is provided. FIGS. 1 and 2 depict a representation and an exploded view of an embodiment of a liquid cooling heat exchange apparatus. Referring to FIGS. 1 and 2, the liquid cooling heat exchange apparatus 10 is generally cylinder shaped. The water block set 100 comprises a water block 120, a water block cover 110 and a surge directing plate 160. The water block 120 has a heat transfer surface T comprising a width, is generally quadrilateral shaped and is configured to exchange heat with the working fluid. The water block cover 110 is securely mounted on the water block facing the heat transfer surface T. The water block 120 comprises an inlet port C1, a cover diversion opening H1, a cover outlet through hole H2 and an outlet port C2. The inlet port C1, cover diversion opening H1, cover outlet through hole H2 and outlet port C2 are generally cylinder shaped. The surge directing plate 160 is assembled to and communicating with and between the water block cover 110 and water block 120. The pump unit 200 is securely mounted on the water block set 100. The pump unit 200 comprises a rotor housing 130, a stator assembly 220 and a pump cover 150. The pump unit 200 is generally cylinder shaped. The rotor housing 130 is securely mounted on and communicating with the water block cover 110 opposite the water block 120. The rotor housing 130 comprises an impeller cavity 131 having an impeller cavity inlet H3 and an impeller cavity outlet H4. The stator assembly 220 is assembled to the rotor housing 130 opposite the impeller cavity 131, facing the water block cover 110, in a liquid free chamber S4 defined by the rotor housing 130 and water block cover 110, and configured to increase a pressure and flow through of the working fluid. The pump cover 150 is securely mounted on the rotor housing 130 opposite the stator assembly 220. The working fluid flows through the inlet port C1 and cover diversion opening H1 before flowing through the impeller cavity inlet H3 and impeller cavity outlet H4, and then through the cover outlet through hole H2 and throughout the heat transfer surface T, and then through the outlet port C2. The inlet port C1 and outlet port C2 are on a same side of the water block cover 110, the cover diversion opening H1 is near to the same side of the inlet and outlet ports C1, C2 and the cover outlet through hole H2 is near to an opposite side of the inlet and outlet ports C1, C2.

In some embodiments, the water block 120 further comprises a plurality of heat transfer surface features 121 on the heat transfer surface T. The heat transfer surface features 121 comprise one or more of fins. However, those of ordinary skill in the relevant art may readily appreciate that the heat transfer surface features 121 comprise one or more of vanes, blades, channels, ducts, pins, posts, covers, slots, protrusions, recesses, perforations, holes, textured surfaces, segmented elements, staggered elements, or smooth surfaces, and the embodiments are not limited thereto. The surge directing plate 160 comprises a surge directing opening 161, disposed centrally and longitudinally therethrough, shaped as an elongated slot, and an outlet cut out 162, on a corner end thereof. The surge directing plate 160 is assembled on and completely covering the heat transfer surface T, defining a heat transfer chamber S2, and the surge directing opening 161 is aligned to the heat transfer surface T.

Figure 3:
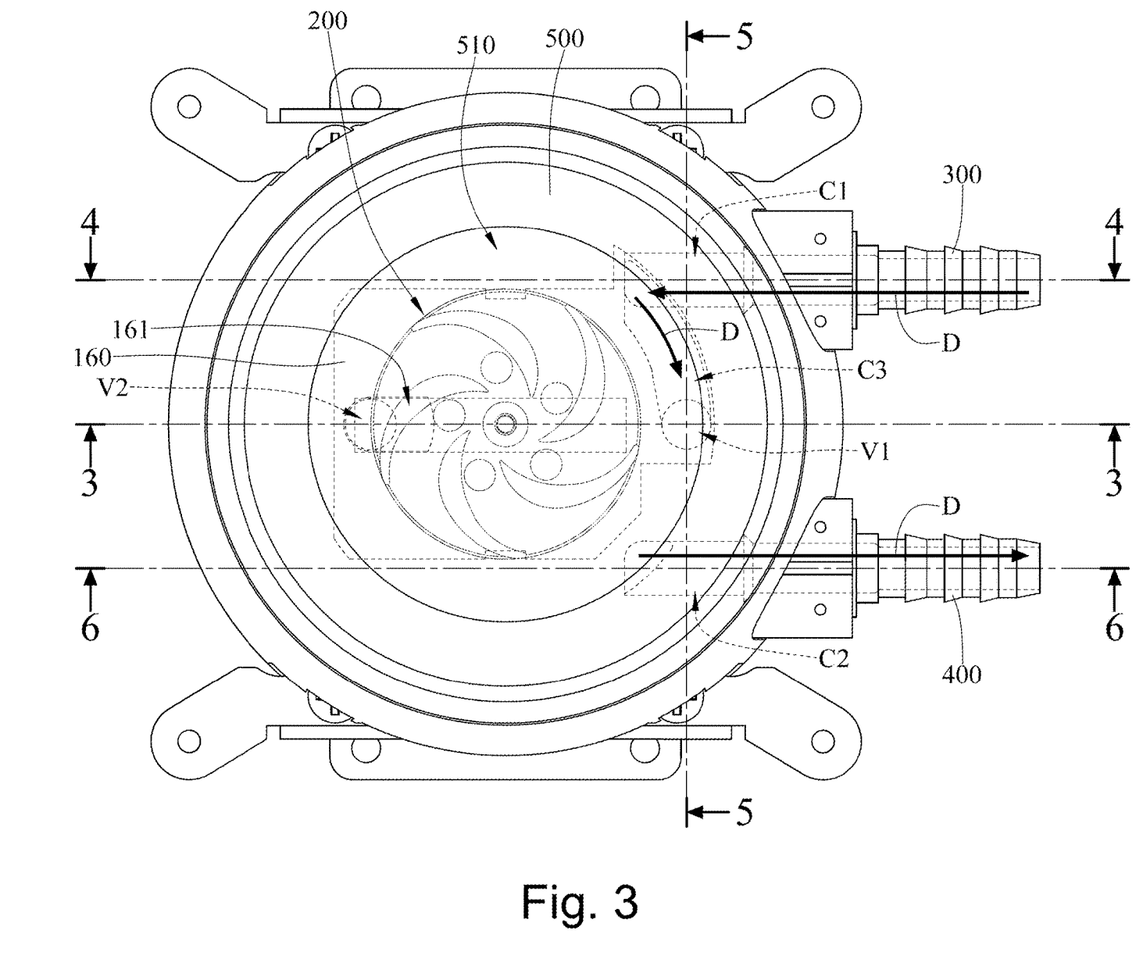
FIG. 3 depicts view sections of the embodiment of the liquid cooling heat exchange apparatus of FIG. 1.
Figure 4:
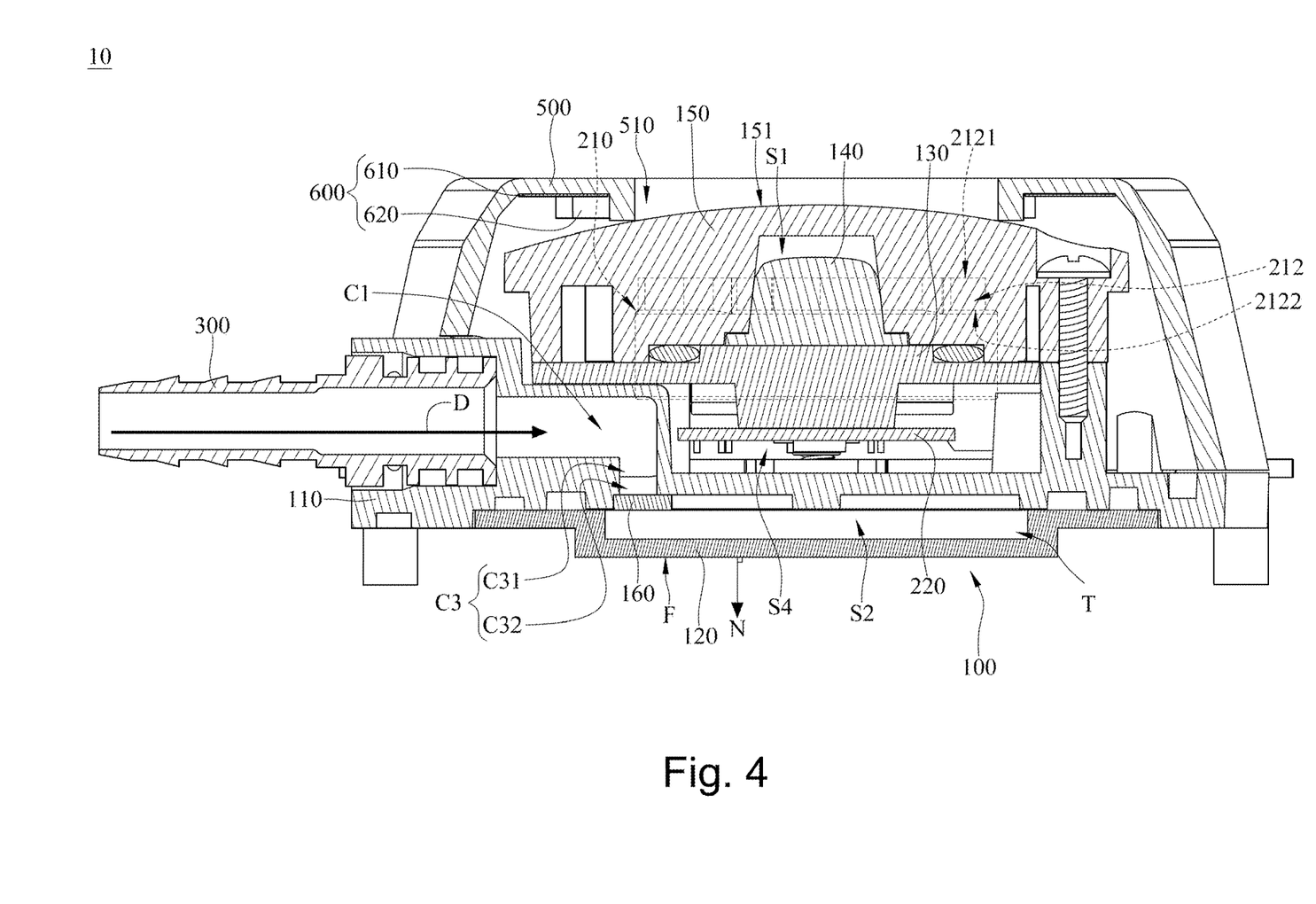
FIG. 4 depicts a cross-sectional view of the liquid cooling heat exchange apparatus of FIG. 1, viewed along section 4-4 in FIG. 3.

FIG. 3 depicts view sections of the embodiment of the liquid cooling heat exchange apparatus of FIG. 1. FIG. 4 depicts a cross-sectional view of the liquid cooling heat exchange apparatus of FIG. 1, viewed along section 4-4 in FIG. 3. Referring to FIGS. 3 and 4, and referring to FIGS. 1 and 2, the surge directing opening 161 is shaped as an elongated slot extends perpendicular (or transversely) to the plurality of heat transfer surface features 121 or fins. The working fluid flows through the cover outlet through hole H2 at an end of the surge directing opening 161 opposite the outlet cut out 162 before flowing through the surge directing opening 161 and throughout the heat transfer surface T and then through the outlet port C2 via the outlet cut out 162.

In certain embodiments, the water block 120 is in direct or indirect contact with a heat source opposite the heat transfer surface T. In some embodiments, the water block 120 further comprises a heat interface surface F opposite the heat transfer surface T, whereby the heat interface surface F is adaptable to be in thermal contact with a thermal load. The water block 120, as known to those of ordinary skill in the relevant art, may be made from a heat conducting material having a relative high heat thermal conductivity such as copper or aluminum, whereby the heat interface surface F is a flat surface for abutting a free surface of a heat generating component such as a CPU, GPU, and/or other processing unit.

In certain embodiments, the water block cover 110 further comprises a cover diversion channel C3. The cover diversion channel C3 communicates with and between the inlet port C1 and cover diversion opening H1, facing the heat transfer surface T, and the working fluid flows through the inlet port C1 and cover diversion opening H1 via the cover diversion channel C3.

In certain embodiments, the surge directing plate 160 further comprises a plate cover end 163 on a same side as the outlet cut out 162, configured to assemble to and cover the cover diversion channel C3. The working fluid flows through the inlet port C1 and cover diversion opening H1 via the cover diversion channel C3 covered by the plate cover end 163. In certain embodiments, the cover diversion channel C3 comprises a slanted section C31 and a flat section C32, whereby the working fluid flows through the inlet port C1 and the slanted section C31 and flat section C32 of the cover diversion channel C3 covered by the plate cover end 163, before flowing through the cover diversion opening H1.

In some embodiments, the pump unit 200 further comprises an impeller 210 and an impeller cover 140. The impeller 210 and an impeller cover 140 are generally cylinder shaped. The impeller 210 has a plurality of curved blades 212 on a blade assembly surface 2111 thereof, mounted to a shaft. In certain embodiments, impeller 210 further has a blade conical sidewall 211 defining a hollow cylinder shape of the impeller 210 with the blade assembly surface 2111. In certain embodiments, each of the plurality of curved blades 212 comprise a first blade side portion 2121 and a second blade side portion 2122, opposite the first blade side portion 2121. The second blade side portion 2122 of each of the plurality of curved blades 212 are disposed on the blade assembly surface 2111. The impeller cover 140 has at least one through hole 1411, covering the impeller 210. In certain embodiments, impeller cover 140 further has a roof portion 141 and conical sidewalls 142, wherein the at least one through hole 1411 is generally disposed near to a center of the roof portion 141. In certain embodiments, the amount of the at least one through hole 1411 is three. In certain embodiments, the impeller cover 140 and the impeller 210 define an impeller receiving space S3 therebetween. The rotor housing 130 further comprises a stator cavity 132 (or a concavity) extending axially in the rotor housing 130, opposite the impeller cavity 131, wherein the stator assembly 220 is mounted in the stator cavity 132. The impeller 210 and impeller cover 140 is mounted in the impeller cavity 131.

Figure 5:
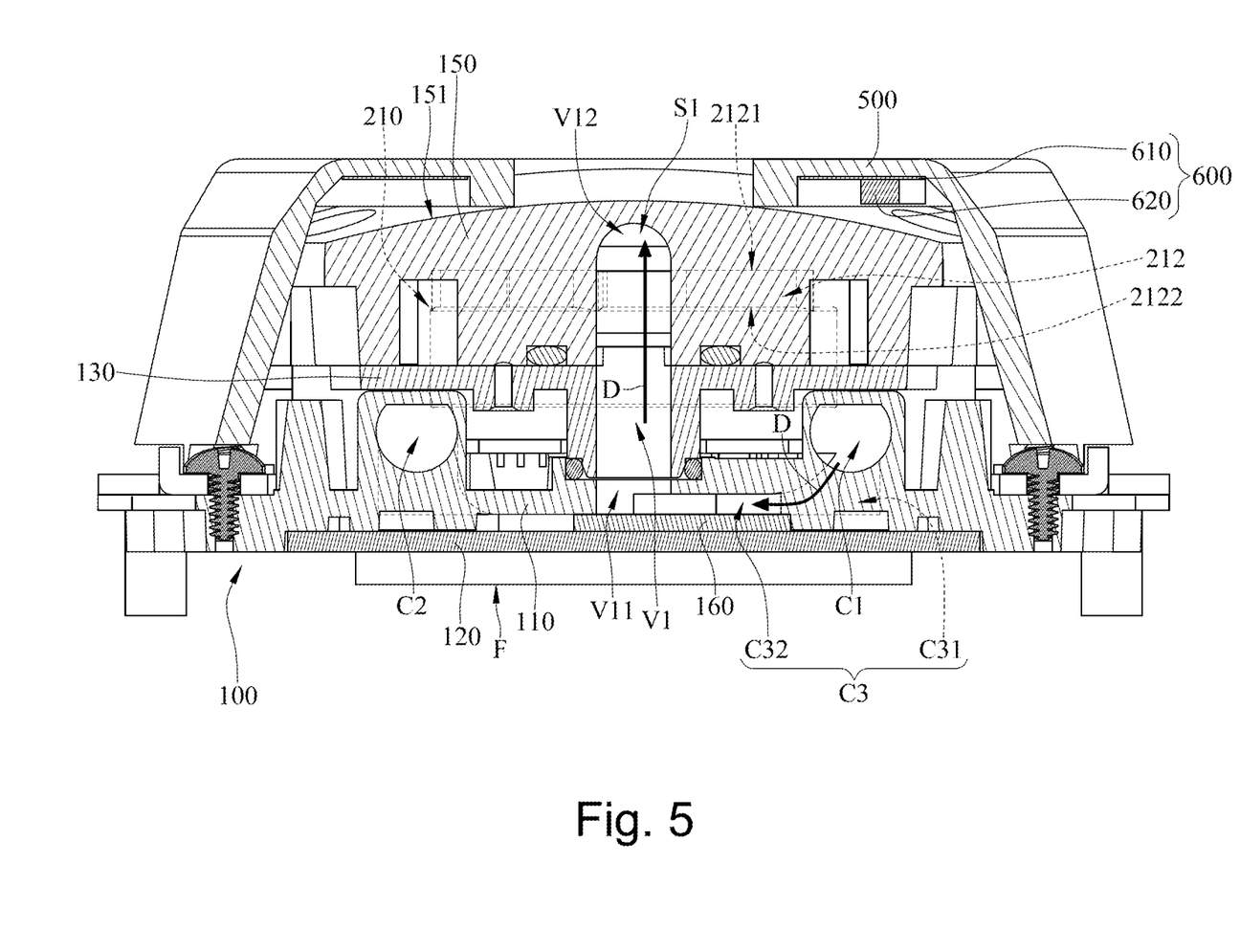
FIG. 5 depicts a cross-sectional view of the liquid cooling heat exchange apparatus of FIG. 1, viewed along section 5-5 in FIG. 3.

FIG. 5 depicts a cross-sectional view of the liquid cooling heat exchange apparatus of FIG. 1, viewed along section 5-5 in FIG. 3. Referring to FIG. 5 and referring to FIGS. 1 to 4, in certain embodiments, a straight inlet flow channel V1 is defined by the cover diversion opening H1 and impeller cavity inlet H3 at a first side V11 thereof, and an outer side of the impeller cover 140 and impeller cavity 131 to a second side V12, opposite the first side V11, and a straight outlet flow channel V2 is defined by an inner side of the impeller cover 140 and impeller cavity 131, impeller cavity outlet H4, and cover outlet through hole H2. In certain embodiments, the pump cover 150 comprises a cover roof portion 151. In certain embodiments, an inlet chamber S1 is defined by the roof portion 141 and cover roof portion 151. The working fluid flows through the impeller cavity inlet H3 and impeller cavity outlet H4 and through the outer side of the impeller cover 140, through the at least one through hole 1411, and then through an inner side of the impeller cover 140, whereby the impeller 210 is rotatable in the impeller cavity 131 and the stator assembly 220 drives the impeller 210.

In some embodiments, the inlet and outlet ports C1, C2 are integrally formed with the water block cover 110 and configured for mounting of at least one of a fitting, a connector, or a conduit. In some embodiments, the liquid cooling heat exchange apparatus 10 further comprises an inlet connector 300 and outlet connector 400. The inlet connector 300 and outlet connector 400 may be mounted to the inlet and outlet ports C1, C2, respectively.

In some embodiments, the pump cover 150 comprises at least one of a transparent or translucent material. In certain embodiments, the impeller cover 140 comprises at least one of a transparent or translucent material. The transparent or translucent material permits light to pass therethrough. For example, the pump cover 150 and/or impeller cover 140 is made of glass, plastic, or the like, as known to those of ordinary skill in the art. Those of ordinary skill in the relevant art may also readily appreciate that in certain embodiments, the pump cover 150 and impeller cover 140 may also comprise of a non-transparent or non-translucent material and the embodiments are not limited thereto.

In some embodiments, the liquid cooling heat exchange apparatus 10 further comprises an aesthetic cover 500 positioned on the water block cover 110, the rotor housing 130, and the pump cover 150. The aesthetic cover 500 is generally cylinder shaped. The aesthetic cover 500 at least partially encloses the water block cover 110, the rotor housing 130, and the pump cover 150, wherein the aesthetic cover 500 defines a cover opening 510 on a top surface thereof.

In some embodiments, the liquid cooling heat exchange apparatus 10, further comprises a light apparatus 600 having one or more light sources 620. In certain embodiments, the light apparatus 600 further comprises a light assembly 610, made of a printed circuit board, a flexible circuit board, or the like. The light assembly 610 is an annular disk-shaped structure (similar to a washer) that includes the one or more light source 620. The one or more light sources 620 may be disposed on a lower surface (with reference to the orientation in FIG. 2) of the light assembly 610. However, the embodiments are not limited thereto. Those of ordinary skill in the relevant art may readily appreciate that the one or more light sources 620 may also be disposed on an upper surface of the light assembly 610. The light apparatus 600 is assembled to an inner surface of the aesthetic cover 500. A diameter of the light apparatus 600 is larger than a diameter of the cover opening 510, and a diameter of the pump cover 150 is larger than the diameters of the cover opening 510 and light apparatus 600. In other words, light assembly 610 surrounds the cover opening 510 and is between the aesthetic cover 500 and pump cover 150 when the light assembly 610 is assembled to the aesthetic cover 500. The light apparatus 600, and thus the one or more light sources 620 included thereon, is stationary and does not rotate when the impeller 210 rotates. As known by those of ordinary skill in the relevant art, the light assembly 610 may also include a control circuit for powering and controlling an operation of the one or more light sources 620. In some embodiments, the one or more light sources 620 may be arranged at regular intervals on the light assembly 610. However, in other embodiments, the one or more light sources 620 may be arranged at irregular (or random) intervals, as known by those of ordinary skill in the relevant art. In certain embodiments, the one or more light sources 620 are light emitting diodes (LEDs). However, the one or more light sources 620 are not limited to LEDs and also include other types of light sources, without departing from the scope of the disclosure. As those having ordinary skill in the relevant art may readily appreciate, the one or more light sources 620 may include at least one light emitting device emitting red light, at least one light emitting device emitting green light, and/or at least one light emitting device emitting blue light. Alternatively, or optionally, the one or more light sources 620 may emit colors other than red, green, and blue. For example, the one or more light sources 620 may include white color and/or yellow color light emitting devices.

Light from the light assembly 610 is emitted from the liquid cooling heat exchange apparatus 10 through the cover opening 510. Those of ordinary skill in the relevant art may readily appreciate that the plurality of curved blades 212 may reflect the light from the one or more light sources 620 and the flow of working fluid may also disperse light. These factors may result in an aesthetically pleasing light effect.

When assembled, stator assembly 220 is received in the stator cavity 132 of the rotor housing 130 and the impeller cover 140 and impeller 210, defining an impeller receiving space S3 therebetween, is received in the impeller cavity 131 of the rotor housing 130. The pump cover 150 is mounted on the rotor housing 130, defining an inlet chamber S1 between the roof portion 141 of the impeller cover 140 and cover roof portion 151 of the pump cover 150. The surge directing plate 160 is assembled to the water block cover 110 facing the water block 120 and the water block cover 110 is mounted to the water block 120. The water block cover 110 and surge directing plate 160 form the roof (or top) of the water block set 100 and the cover diversion channel C3 of the water block cover 110 is covered by the plate cover end 163 of the surge directing plate 160. The walls of the heat transfer surface T of the water block 120 define the heat transfer chamber S2. The pump unit 200 is mounted to the water block set 100. The inlet connector 300 is mounted to the inlet port C1 and the outlet connector 400 is mounted to the outlet port C2.

The light apparatus 600 may be assembled to an inner surface of the aesthetic cover 500. The aesthetic cover 500 may be mounted on the water block cover 110, the rotor housing 130, and the pump cover 150, at least partially enclosing the water block cover 110, the rotor housing 130, and the pump cover 150.

Figure 6:
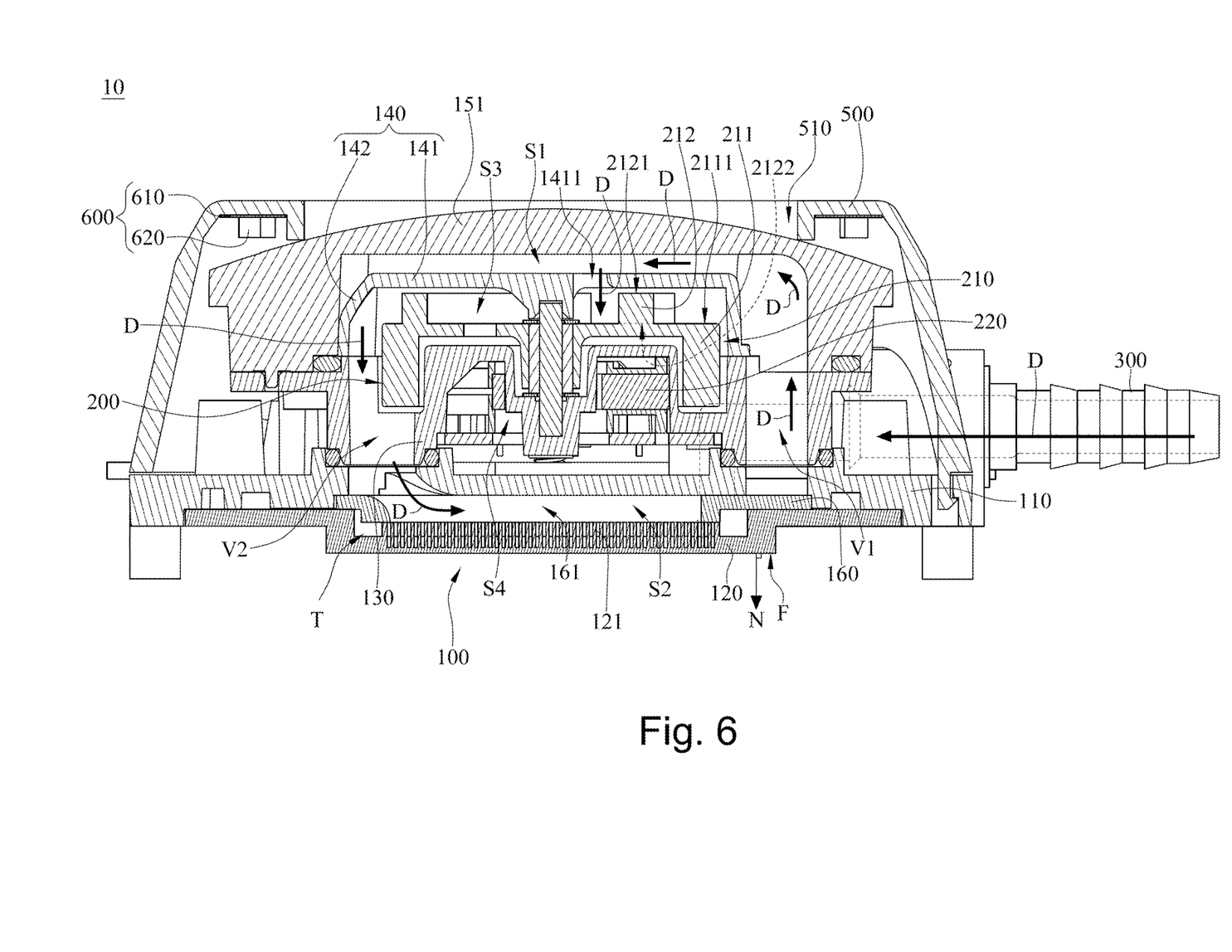
FIG. 6 depicts a cross-sectional view of the liquid cooling heat exchange apparatus of FIG. 1, viewed along section 3-3 in FIG. 3.
Figure 7:
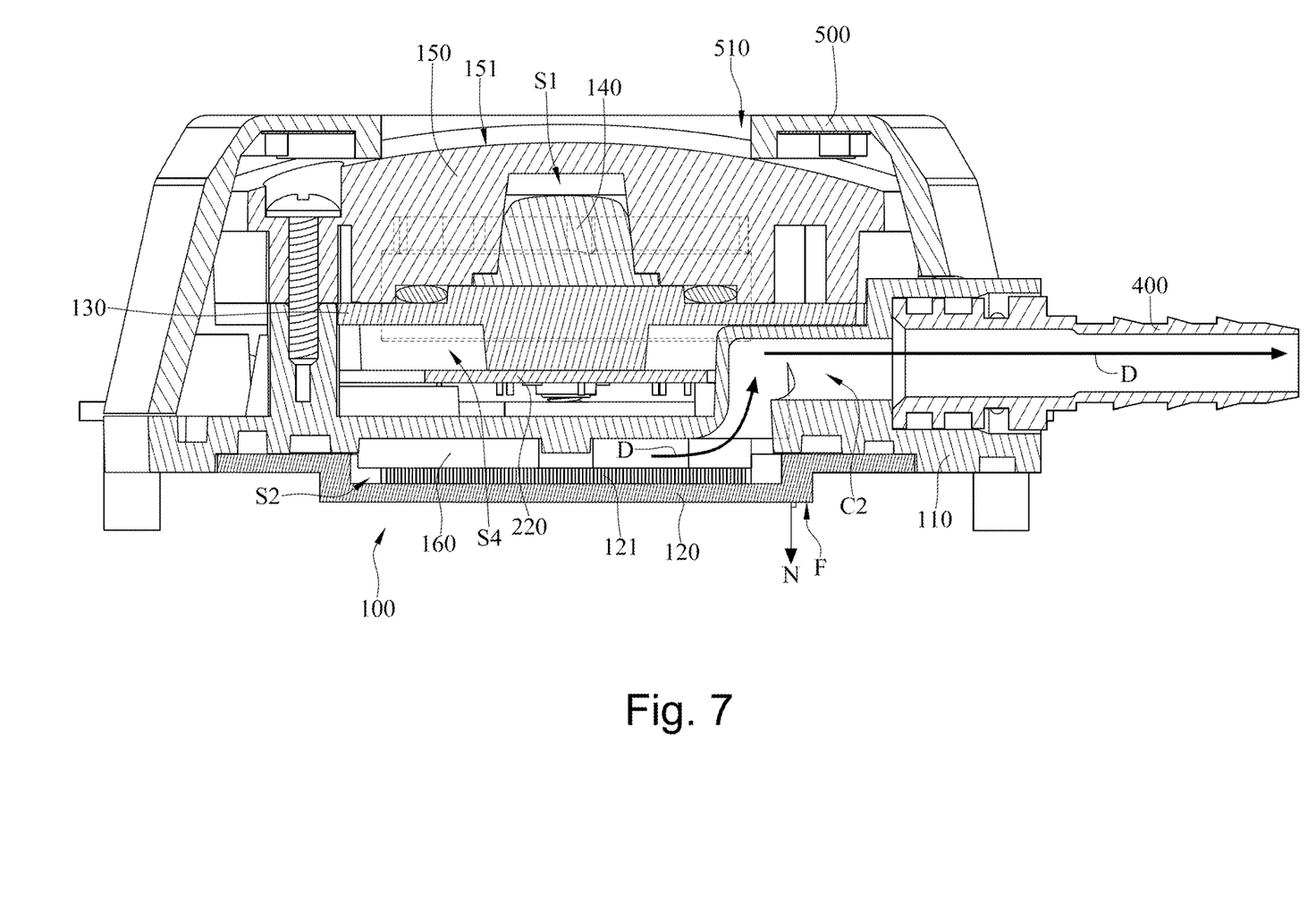
FIG. 7 depicts a cross-sectional view of the liquid cooling heat exchange apparatus of FIG. 1, viewed along section 6-6 in FIG. 3.

FIG. 6 depicts a cross-sectional view of the liquid cooling heat exchange apparatus of FIG. 1, viewed along section 3-3 in FIG. 3. FIG. 7 depicts a cross-sectional view of the liquid cooling heat exchange apparatus of FIG. 1, viewed along section 6-6 in FIG. 3. Referring to FIGS. 6 and 7 and referring to FIGS. 1 to 5, during operation, working fluid is sucked via the inlet port C1, as shown by the direction of fluid flow D, pass the slanted section C31 and flat section C32 of the cover diversion channel C3 covered by the plate cover end 163, through the straight inlet flow channel V1 defined by the cover diversion opening H1, impeller cavity inlet H3 and an outer side of the impeller cover 140 and impeller cavity 131. The working fluid next travels through the inlet chamber S1 between the roof portion 141 and cover roof portion 151 of the pump cover 150 and through the at least one through hole 1411, to the impeller receiving space S3 defined by the impeller cover 140 and impeller 210. The working fluid then travels through the straight outlet flow channel V2, defined by an inner side of the impeller cover 140 and impeller cavity 131, in the direction of fluid flow N, through the impeller cavity outlet H4 and cover outlet through hole H2 at an end of the surge directing opening 161 before flowing through the surge directing opening 161 and throughout the heat transfer surface T and then through the outlet port C2 via the outlet cut out 162.

In the embodiments, as those skilled in the relevant art may readily appreciate, sealing elements, such as O-rings, may be used at the interface of different components to create a liquid-tight seal and minimize leaks, and fasteners such as screws, bolts, and pins, may be used at the interface of different components for assembly and/or mounting thereamong.

The pump unit 200 or any other parts of the cooling liquid heat exchange apparatus 10, which are possibly manufactured from a plastic material, may be "metalized" in order to minimize liquid diffusion or evaporation of the liquid, as known to those of ordinary skill in the relevant art. The metal may be provided as a thin layer of metal coating provided on either or on both of the internal side or/and the external side of the plastic part.

The working fluid of the liquid cooling system may be any type of working fluid such as water, water with additives such as anti-fungicide, water with additives for improving heat conducting or other special compositions of working fluids such as electrically non-conductive liquids or liquids with lubricant additives or anti-corrosive additives, as known to those of ordinary skill in the relevant art.

Control of the liquid cooling heat exchange apparatus 10, driven by AC or DC power, may take place by means of an operative system or like means or the electric and/or electronics system itself, wherein the electric and/or electronics system comprises a means for measuring load and/or temperature of one or more processors, as known to those of ordinary skill in the relevant art. Using the measurement performed by the operative system or a like system eliminates the need for special means for operating the liquid cooling heat exchange apparatus 10. Communication between the operative system or a like system and a processor for operating the liquid cooling heat exchange apparatus 10 may take place along already established communication links in the system such as a USB-link. Thereby, a real-time communication between the liquid cooling system and liquid cooling heat exchange apparatus 10 may be provided without any special means for establishing the communication.

Further control strategies utilizing the operative system or a like system may involve balancing the rotational speed of the liquid cooling heat exchange apparatus 10 as a function of the cooling capacity needed and/or controlling the emitted light from the light assembly 610, as also known to those of ordinary skill in the relevant art.

In an embodiment, a liquid cooling heat exchange apparatus 10 comprising a water block set 100 and pump unit 200 is provided. The water block set 100 has a water block cover 110 having an inlet port C1, cover diversion channel C3, cover diversion opening H1, cover outlet through hole H2 and outlet port C2, surge directing plate 160 having a plate cover end 163, and water block 120. The pump unit 200 has a rotor housing 130 having an impeller cavity 131 (or a concavity) extending axially in the rotor housing 130, the impeller cavity 131 comprising an inlet H3 and outlet H4. The inlet and outlet ports C1, C2 and the cover diversion opening H1 is at a same side, the cover outlet through hole H2 is at an opposite side. During operation, working fluid is sucked via the inlet port C1, pass the cover diversion channel C3 covered by the plate cover end 163, through the cover diversion opening H1 and impeller cavity inlet H3. The working fluid next travels through the impeller cavity 131, and outlet H4, and cover outlet through hole H2, through the water block 120, before exiting through the outlet port C2.

When lighter, thinner, and smaller electric and electronic elements, devices and systems are required with a same head specification for a pump of a heavier, wider, and larger counterpart electric and electronic elements, devices and systems, lighter, thinner, and smaller pumps meeting the head specification are lacking. The liquid cooling heat exchange apparatus 10 and heat removal or transfer methods of the embodiments minimize components for a lighter, thinner, and smaller liquid cooling system. Additionally, working fluid flow and heat dissipation efficiency are increased through the design of the liquid cooling heat exchange apparatus 10. The inlet port C1 and outlet port C2 are on a same side of the water block cover 110, and the cover diversion opening H1 is near to the same side of the inlet and outlet ports C1, C2 for close proximity to the inlet port C1. The cover outlet through hole H2 is near to an opposite side of the inlet and outlet ports C1, C2 for efficient directional working fluid flow through the surge directing opening 161 and heat transfer chamber S2, to out of the outlet port C2 via the outlet cut out 162. Additionally, working fluid is sucked via the inlet port C1 pass the cover diversion channel C3 covered by the plate cover end 163, through the straight inlet flow channel V1, through the impeller receiving space S3 and then through the straight outlet flow channel V2. The straight inlet flow channel V1 and straight outlet flow channel V2 provide efficient working fluid flows and increased heat dissipation efficiency. Additionally, light from the light assembly 610 emitted from the liquid cooling heat exchange apparatus 10 through the cover opening 510, results in an aesthetically pleasing light effect, providing an aesthetically pleasing appearance for a more relaxed environment for fatigued users of computers who spend long times at tasks.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112f unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A liquid cooling heat exchange apparatus configured to be flow through by a working fluid, comprising:
a water block set, comprising:
a water block, having a heat transfer surface comprising a width, configured to exchange heat with the working fluid;
a water block cover, being flat, securely mounted on the water block facing the heat transfer surface, the water block cover comprising:
an inlet port;
a cover diversion opening;
a cover outlet through hole; and
an outlet port; and
a surge directing plate, assembled to and communicating with and between the water block cover and water block; and
a pump unit, securely mounted on the water block set, comprising:
a rotor housing, securely mounted on and communicating with the water block cover opposite the water block, the rotor housing comprising an impeller cavity having an impeller cavity inlet and an impeller cavity outlet;
a stator assembly, assembled to the rotor housing opposite the impeller cavity, facing the water block cover, configured to increase a pressure and flow through of the working fluid; and
a pump cover, securely mounted on the rotor housing opposite the stator assembly,
wherein the inlet port, the cover diversion opening, the impeller cavity inlet, the impeller cavity outlet, the cover outlet through hole, the heat transfer surface, and the outlet port are configured so that the working fluid flows through the inlet port and cover diversion opening before flowing through the impeller cavity inlet and impeller cavity outlet, and then through the cover outlet through hole and throughout the heat transfer surface, and then through the outlet port, and
wherein the inlet port and outlet port are on a same side of the water block cover, and a distance between the cover diversion opening and the inlet and outlet ports is less than a distance between the cover outlet through hole and the inlet and outlet ports.

2. The liquid cooling heat exchange apparatus of claim 1, wherein the water block further comprises a plurality of heat transfer surface features on the heat transfer surface, and the surge directing plate comprises a surge directing opening, disposed centrally and longitudinally therethrough, and an outlet cut out, on a corner end thereof, the surge directing plate assembled on and completely covering the heat transfer surface and the surge directing opening aligned to the heat transfer surface, wherein the cover outlet through hole, the surge directing opening, the heat transfer surface, the outlet cut out, and the outlet port are configured so that the working fluid flows through the cover outlet through hole at an end of the surge directing opening opposite the outlet cut out before flowing through the surge directing opening and throughout the heat transfer surface and then through the outlet port via the outlet cut out.

3. The liquid cooling heat exchange apparatus of claim 2, wherein the water block is in direct or indirect contact with a heat source opposite the heat transfer surface.

4. The liquid cooling heat exchange apparatus of claim 2, wherein the water block cover further comprises a cover diversion channel communicating with and between the inlet port and cover diversion opening, facing the heat transfer surface, and the working fluid flows through the inlet port and cover diversion opening via the cover diversion channel.

5. The liquid cooling heat exchange apparatus of claim 4, wherein the surge directing plate further comprises a plate cover end on a same side as the outlet cut out, configured to assemble to and cover the cover diversion channel, wherein the working fluid flows through the inlet port and cover diversion opening via the cover diversion channel covered by the plate cover end.

6. The liquid cooling heat exchange apparatus of claim 5, wherein the impeller cover comprises at least one of a transparent or translucent material.

7. The liquid cooling heat exchange apparatus of claim 1, wherein the pump unit further comprises an impeller having a plurality of curved blades on a blade assembly surface thereof, mounted to a shaft, and an impeller cover having at least one through hole, covering the impeller, and the rotor housing further comprises a stator cavity opposite the impeller cavity, wherein the stator assembly is mounted in the stator cavity and the impeller and impeller cover is mounted in the impeller cavity, and wherein the impeller cover, the impeller cavity inlet, impeller cavity outlet, and the at least one through hole are configured so that the working fluid flows through the impeller cavity inlet and impeller cavity outlet via an outer side of the impeller cover, through the at least one through hole, and then through an inner side of the impeller cover, whereby the impeller is rotatable in the impeller cavity and the stator assembly drives the impeller.

8. The liquid cooling heat exchange apparatus of claim 1, wherein the inlet and outlet ports are integrally formed with the water block cover and configured for mounting of at least one of a fitting, a connector, or a conduit.

9. The liquid cooling heat exchange apparatus of claim 1, wherein the pump cover comprises at least one of a transparent or translucent material.

10. The liquid cooling heat exchange apparatus of claim 1, further comprising a cover positioned on the water block cover, the rotor housing, and the pump cover, the cover at least partially enclosing the water block cover, the rotor housing, and the pump, wherein the cover defines a cover opening on a top surface of the cover.

11. The liquid cooling heat exchange apparatus of claim 10, further comprising a light apparatus having one or more light sources, assembled to an inner surface of the cover, wherein light from the light assembly is emitted from the liquid cooling heat exchange apparatus through the cover opening.

* * * * *